No. 615,987. Patented Dec. 13, 1898.
S. HOLMGREN.
HEATING STOVE.
(Application filed Feb. 4, 1898.)
(No Model.)
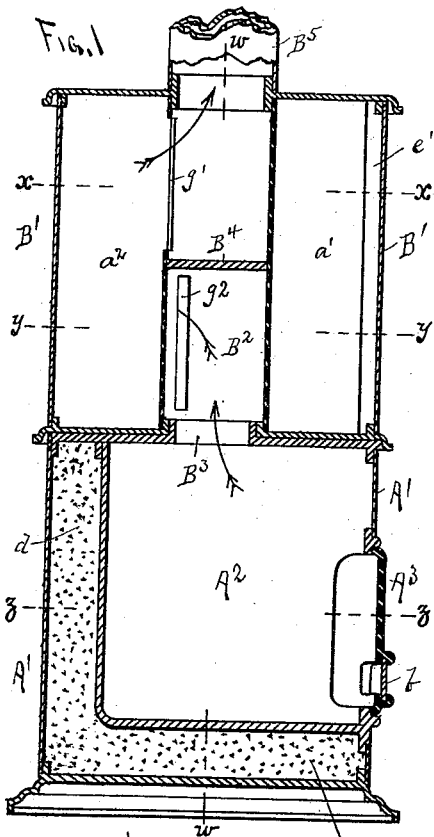
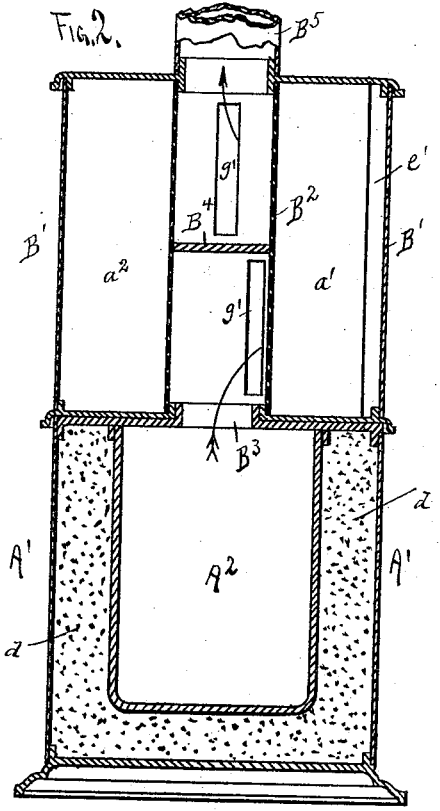
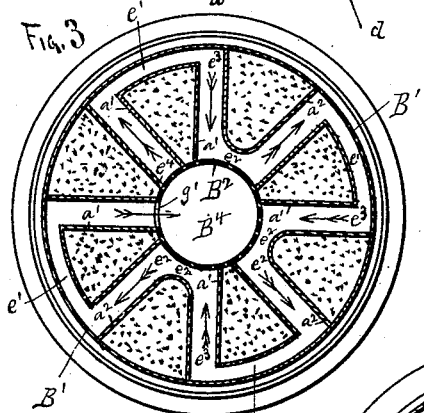
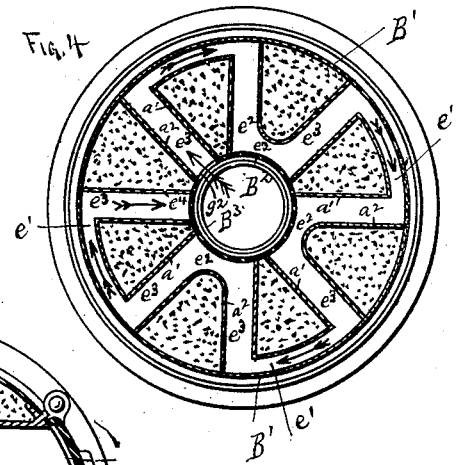
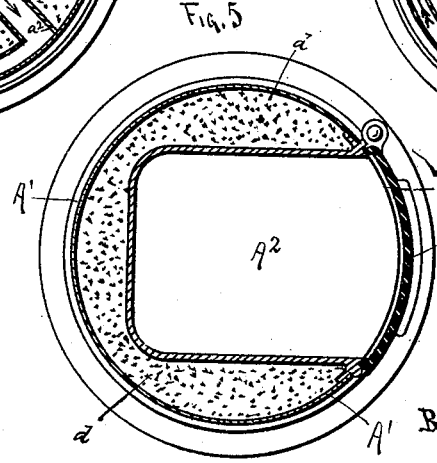
WITNESSES.
Swan Holmgren,
INVENTOR,
By Charles N. Woodward
Atty.

UNITED STATES PATENT OFFICE.

SWAN HOLMGREN, OF ST. PAUL, MINNESOTA.

HEATING-STOVE.

SPECIFICATION forming part of Letters Patent No. 615,987, dated December 13, 1898.

Application filed February 4, 1898. Serial No. 669,059. (No model.)

*To all whom it may concern:*

Be it known that I, SWAN HOLMGREN, a subject of the King of Sweden and Norway, (but having declared my intention of becoming a citizen of the United States,) residing at St. Paul, in the county of Ramsey and State of Minnesota, have invented certain new and useful Improvements in Heating-Stoves, of which the following is a specification.

This invention relates to heating-stoves; and it consists in the construction, combination, and arrangement of parts, as hereinafter shown and described, and specifically pointed out in the claims.

In the drawings, Figure 1 is a transverse sectional elevation, and Fig. 2 is a cross-sectional elevation on the line $w\ w$ of Fig. 1. Fig. 3 is a cross-sectional plan view on the line $x\ x$ of Fig. 1. Fig. 4 is a cross-sectional plan view on the line $y\ y$ of Fig. 3. Fig. 5 is a cross-sectional plan view through the fire-chamber on the line $z\ z$ of Fig. 1.

This heating-stove is formed in two parts—the lower portion, containing the fire-chamber, and the upper part, through which the smoke, gases, and other products of combustion pass, thereby forming a "radiator."

A' is the outer casing of the lower section, having the combustion-chamber $A^2$ arranged in its interior, and with the door $A^3$, by which access may be had to the combustion-chamber, and with a slide $b$, by which the necessary draft enters. The combustion-chamber $A^2$ is smaller than the casing A', and preferably with space $d$ between the casing and chamber filled with sand, brick, or some other similar suitable substance which possesses the property of retaining and absorbing heat. Upon top of this lower section the upper section B' rests and with a flue $B^2$, registering with the exit-flue $B^3$ of the fire-chamber section, so that the smoke, gases, and other products of combustion will be carried from the combustion-chamber to the upper or radiating section. The flue $B^2$ is divided about midway by a cross-partition $B^4$, as shown in Figs. 1 and 2. Leading outward from the central flue $B^2$ are a series of partitions $a'$, having the space inclosed by them preferably filled with sand, brick, or other suitable substance which possesses the property of absorbing and retaining heat. The partitions $a'$ do not extend to the outer shell of the upper section B', but leave spaces $e'$, as shown in Fig. 3. Leading inward from the shell of the upper section B' are a series of partitions $a^2$, alternating with the partitions $a'$ and not extending to the central flue $B^2$, but leaving spaces $e^2$, as shown in Figs. 3 and 4. Spaces $e^3$ are also left between the partitions $a'\ a^2$, as shown in Figs. 3 and 4. One of the partitions $a^2$ extends entirely across the face between the wall of the upper section B' and the central flue $B^2$, as shown at $e^4$ in Figs. 3 and 4. An opening $g'$ is formed in the flue $B^2$ above the cross-partition $B^4$ on one side of the partition $e^4$, and another opening $g^2$ is formed in the flue $B^2$ below the partition and leading into the space on the opposite side of the partitions $e^4$, as shown in Figs. 1, 2, 3, and 4. By this arrangement the products of combustion rising into the flue $B^2$ below the cross-partition $B^5$ pass out through the opening $g^2$, and thence back and forth through the spaces $a'$ and around the partitions $a'\ a^2$, as indicated by the arrows in Fig. 3, and thence through the opening $g'$ into the flue $B^2$, and thence out through the exit-flue $B^3$ to the chimney. By this means all the smoke, flame, and other products of combustion pass in "zigzag" lines back and forth through the chamber B', where the heat is absorbed by the sand or other filling and retained and radiated.

In some cases the sand or other filling might be dispensed with and the hot air alone depended on to absorb and radiate the heat.

Having thus described my invention, what I claim as new is—

1. In a heating-stove, a combustion-chamber, a shell or casing having a central tubular member registering with the outlet to said combustion-chamber and with a central cross-partition therein, a series of inner radiating-partitions within said casing and connected to said central tubular member and reaching outward nearly to said casing, a series of outer radiating-partitions connected to the interior of said casing and extending inward nearly to said central tubular member and alternating with the said inner radiating-partitions, one of said outer partitions being extended to close the passage between the central tubular member and said shell or casing, an opening through said central tubular member below said cross-partition and at one side of said extended partition, and an opening through said central tubular member above said cross-partition and at the other side of said extended partition, whereby the smoke, flame, and other products of combustion will be caused to traverse a "zigzag" course throughout the interior of said shell or casing, substantially as and for the purpose set forth.

2. In a heating-stove, a combustion-chamber, a shell or casing having a central tubular member registering with the outlet to said combustion-chamber and with a central cross-partition therein, a series of inner radiating-partitions within said casing and connected to said central tubular member and reaching outward nearly to said casing, a series of outer radiating-partitions connected to the interior of said casing and extending inward nearly to said central tubular member and alternating with said inner radiating-partitions, one of said outer partitions being extended to close the passage between the central tubular member and said shell or casing, an opening through said central tubular member below said cross-partition and at one side of said extended partition, and an opening through said central tubular member above said cross-partition and at the other side of said extended partition, and with a filling of sand or other non-conductive substance between the walls of said partitions, substantially as and for the purpose hereinbefore set forth.

In testimony whereof I have hereunto set my hand in the presence of two subscribing witnesses.

SWAN HOLMGREN.

In presence of—
C. N. WOODWARD,
LEWIS D. MANN.